US009057280B2

United States Patent
Morand et al.

(10) Patent No.: US 9,057,280 B2
(45) Date of Patent: Jun. 16, 2015

(54) CONTACTING VANES

(75) Inventors: Nicolas Morand, Vosges (FR); Olivier Espasa, Dogneville (FR); Francis Abel, Vosges (FR); Lorrain Sausse, Charmes (FR); Julien Mailfert, Nancy (FR); Frederic Favray, Epinal (FR); Emmanuel Bouvier, Epinal (FR)

(73) Assignee: Honeywell International Inc., Morristown, NJ (US)

( * ) Notice: Subject to any disclaimer, the term of this patent is extended or adjusted under 35 U.S.C. 154(b) by 559 days.

(21) Appl. No.: 13/363,137

(22) Filed: Jan. 31, 2012

(65) Prior Publication Data

US 2013/0195629 A1 Aug. 1, 2013

(51) Int. Cl.
*F01D 17/16* (2006.01)
*F01D 9/04* (2006.01)
*F02C 6/12* (2006.01)
*F02C 9/20* (2006.01)

(52) U.S. Cl.
CPC .......... *F01D 17/165* (2013.01); *Y10T 29/49229* (2015.01); *F01D 9/048* (2013.01); *F02C 6/12* (2013.01); *F02C 9/20* (2013.01)

(58) Field of Classification Search
CPC ................ F01D 17/165; F01D 17/167; F05D 2240/123; F05D 2240/124; F02C 6/12; F02C 9/20; Y10T 29/49229
USPC .......................................... 415/163–165, 191
See application file for complete search history.

(56) References Cited

U.S. PATENT DOCUMENTS

| 3,377,051 A * | 4/1968 | Lecher ........................ 415/186 |
| 6,461,105 B1 * | 10/2002 | Nicolson ...................... 415/160 |
| 7,150,151 B2 | 12/2006 | Mulloy et al. |
| 7,255,530 B2 * | 8/2007 | Vogiatzis et al. ............. 415/159 |
| 2003/0170125 A1 * | 9/2003 | Olhofer et al. ............... 416/228 |
| 2005/0226718 A1 * | 10/2005 | Marcis et al. ................. 415/163 |
| 2010/0098529 A1 * | 4/2010 | Roby et al. .................... 415/160 |
| 2011/0312246 A1 * | 12/2011 | Mohamed et al. ................ 451/1 |

FOREIGN PATENT DOCUMENTS

| EP | 0204033 B1 | 6/1988 |
| EP | 0224083 B1 | 3/1989 |
| JP | 63159673 A | 7/1988 |
| WO | 9621094 A1 | 7/1996 |
| WO | WO 9621094 A1 * | 7/1996 |

* cited by examiner

*Primary Examiner* — Dwayne J White
*Assistant Examiner* — Brian P Wolcott
(74) *Attorney, Agent, or Firm* — Brian J. Pangrle

(57) ABSTRACT

An assembly can include vanes and a base configured to seat the vanes at a radial distance about an axis where each vane includes a leading edge and a trailing edge, a pair of lateral surfaces that meet at the leading edge and at the trailing edge, an extension that extends from one of the lateral surfaces and that has a contact surface, and a stop surface to form a contact with a contact surface of another vane to define a minimum flow distance between the vane and the other vane. Various other examples of devices, assemblies, systems, methods, etc., are also disclosed.

17 Claims, 7 Drawing Sheets

US 9,057,280 B2

CONTACTING VANES

TECHNICAL FIELD

Subject matter disclosed herein relates generally to turbomachinery for internal combustion engines and, in particular, to vanes for variable geometry mechanisms.

BACKGROUND

A variable geometry mechanism can adjust a gas throat section, for example, at the inlet to a turbine wheel or at the outlet of a compressor wheel. An adjustment to a gas throat section can alter gas flow direction, gas flow velocity, etc., which may impact back pressure, wheel speed, etc.

As an example, GARRETT® VNT® turbochargers include features to adjust exhaust flow at an inlet to a turbine wheel (e.g., to optimize turbine power for a required load). In such a system, movement of vanes towards a minimum or "closed" position can direct exhaust flow more tangentially to the turbine wheel, which, in turn, imparts more energy to the turbine wheel and, consequently, increases compressor boost delivered by a compressor wheel driven by the turbine wheel. Conversely, movement of vanes towards a maximum or "open" position can direct exhaust flow more radially to a turbine wheel, which, in turn, reduces energy to the turbine wheel and, consequently, decreases compressor boost delivered by a compressor wheel driven by the turbine wheel. Moving vanes to a minimum or "closed" position can also restrict flow and create an increased pressure differential or back pressure (e.g., for any of a variety of purposes related to compressor, turbine, compressor and turbine operation, exhaust gas recirculation, etc.).

As to engine operational conditions and geometry adjustments, at low engine speed and small gas flow, movement toward a minimum or closed position can increase turbine power and boost pressure; whereas, at full engine speed and high gas flow, movement toward a maximum or open position can help to avoid turbine wheel overspeed. Where the turbine wheel drives a compressor wheel, adjustments can help maintain or achieve a desired compressor boost pressure. A controller to control adjustments may include a mechanism that responds to compressor pressure through the use of a pressure actuator, an engine management system using a vacuum actuator, etc.

As mentioned, a variable geometry mechanism may include rotatable vanes arranged a radial distance from a rotational axis of a turbine wheel or a compressor wheel (e.g., in a diffuser section) where each vane includes an upstream edge, referred to as a leading edge, and a downstream edge, referred to as a trailing edge. Between a leading edge and a trailing edge, each vane has a pair of smooth airfoil surfaces. Various mechanical mechanisms exist to maintain spacing between adjacent vanes for a minimum or closed position. However, such mechanisms usually involve various components that may experience wear over time, which, in turn, can alter the spacing between adjacent vanes for a minimum or closed position. Such wear can be detrimental, for example, it may give rise to uncertainties impacting performance as well as emissions.

Technologies, techniques, etc., described in various examples herein pertain to vanes for variable geometry mechanisms, which may be applied to turbines, compressors or turbines and compressors.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
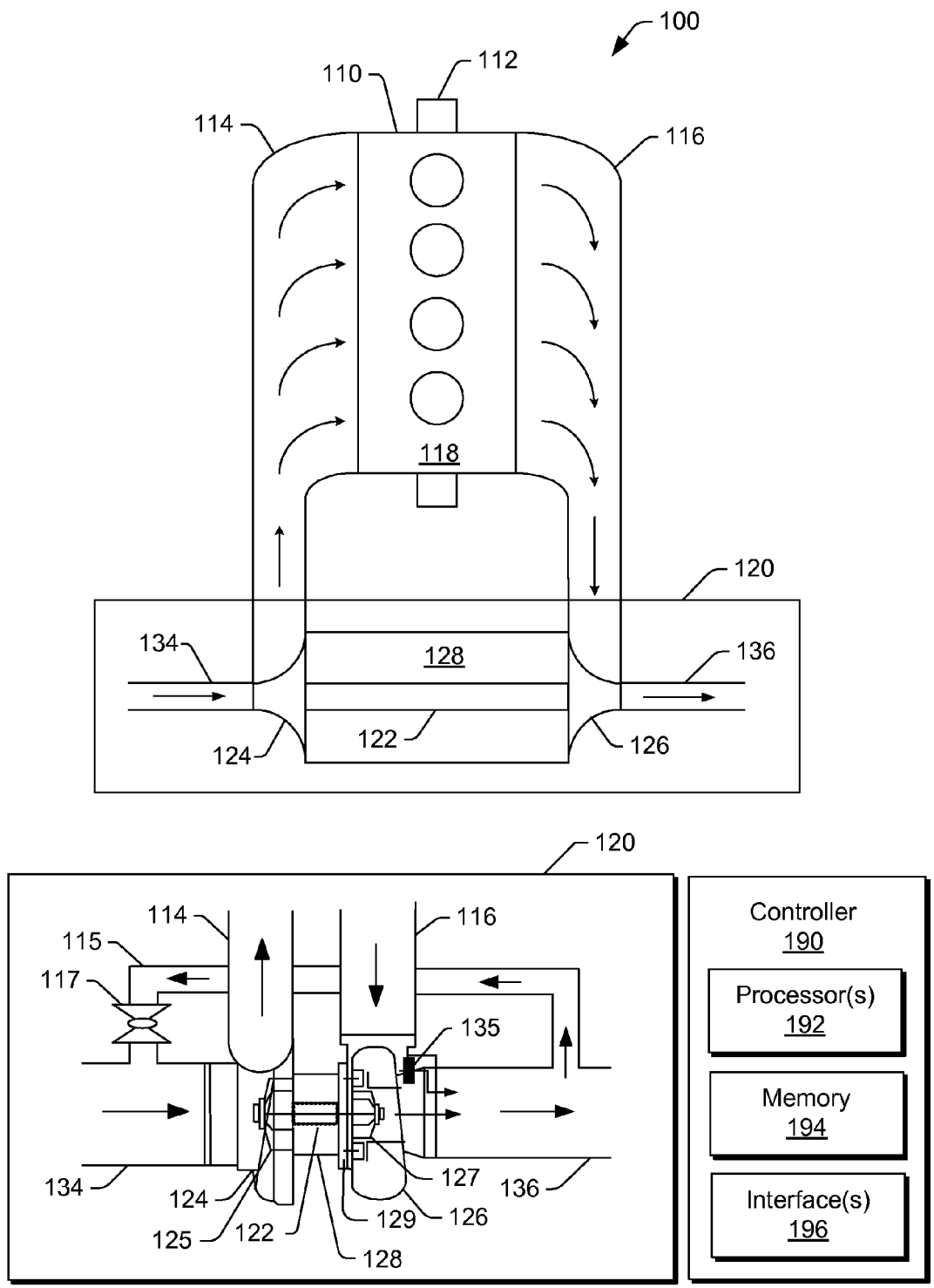
FIG. 1 is a diagram of an example of a turbocharger and an internal combustion engine along with an example of a controller.

As described herein, an assembly can include vanes and a base configured to seat the vanes at a radial distance about an axis. In such an example, each vane can include a leading edge and a trailing edge, a pair of lateral surfaces that meet at the leading edge and at the trailing edge, an extension that extends from one of the lateral surfaces and that comprises a contact surface, and a stop surface to form a contact with a contact surface of another vane to define a minimum flow distance between the vane and the other vane. Such a minimum flow distance may define a throat dimension for gas flow to a turbine wheel or from a compressor wheel.

With respect to a turbocharger fitted with a variable geometry turbine assembly (a "VGT" assembly), over operational lifetime of the VGT assembly, minimum flow drift may occur due to wear, temperature cycling, deformation, etc. Various technologies, techniques, etc., described herein can reduce such drift, for example, by providing vanes where each vane includes an extension that defines a dimension of a flow passage for a minimum flow position of the vanes. As described herein, a vane may have a profile that reduces leakage about an upper, a lower or both upper and lower surfaces of a vane (e.g., with respect to one or more plates). For example, where exhaust leakage is reduced, more of the exhaust is directed via vane throats to the inducer portion of a turbine wheel.

As described herein, vanes and extensions can alleviate a need to set or calibrate a minimum flow position by a screw on a center housing, a pin on a cartridge, etc. Through use of vanes and extensions, various effects of wear, clearance catch-up/stack-up of components, etc., on a minimum flow position can be reduced or eliminated. As an example of wear, during sharp operational transients, forces acting on a vane may affect operability or longevity. Such forces may be from flow of exhaust past surfaces of a vane, pressure differentials or one or more other factors. As described herein, where a minimum flow position is determined via vane-to-vane contact (e.g., extension to vane contact, extension to extension contact), a minimum flow position is less likely to change over the operational lifetime of a variable geometry assembly.

As described herein, an assembly can include vanes where the minimum throat area between two adjacent vanes is determined by direct vane-to-vane contact (e.g., by an extension of one vane contacting another vane). As to various arrangements, a vane may include one or more extensions for contacting a surface or surfaces of another vane. In such arrangements, a surface contacted may be, for example, a lateral surface of the other vane, a surface of an extension of the other vane, etc. Such an approach can reduce the number of contributing factors that affect a minimum flow position of an assembly.

Below, an example of a turbocharged engine system is described followed by various examples of vanes, components, assemblies, methods, etc.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

Also shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

In operation, the turbocharger 120 acts to extract energy from exhaust of the internal combustion engine 110 by passing the exhaust through the turbine 126 (e.g., a volute that directs the exhaust in a tangential and radial direction toward a turbine wheel 127). As shown, rotation of the turbine wheel 127 of the turbine 126 causes rotation of the shaft 122 and hence a compressor wheel 125 of the compressor 124 to compress and enhance density of inlet air to the engine 110. By introducing an optimum amount of fuel, the system 100 can extract more specific power out of the engine 100 (e.g., compared to a non-turbocharged engine of the same displacement).

As to control of exhaust flow, in the example of FIG. 1, the turbocharger 120 includes a variable geometry assembly 129 and a wastegate valve 135. The variable geometry assembly 129 may act to control flow of exhaust to the turbine wheel 127. The wastegate valve (or simply wastegate) 135 is positioned proximate to the inlet of the turbine 126 and can be controlled to allow exhaust from the exhaust port 116 to bypass the turbine wheel 127.

Further, to provide for exhaust gas recirculation (EGR), such a system may include a conduit to direct exhaust to an intake path. As shown in the example of FIG. 1, the exhaust outlet 136 can include a branch 115 where flow through the branch 115 to the air inlet path 134 may be controlled via a valve 117. In such an arrangement, exhaust may be provided upstream of the compressor 124.

The turbocharger 120 of FIG. 1 may optionally include a variable geometry assembly for the compressor 124, for example, to control flow of air in a diffuser section of the compressor 124 where the diffuser section leads to a volute and to the intake port 124.

As mentioned, adjustable vanes positioned at an inlet to a turbine can operate to control flow of exhaust to the turbine. For example, a turbocharger may include a controller to adjust geometry and consequently exhaust flow at an inlet to a turbine wheel to optimize turbine power for a particular load. A variety of control schemes exist for controlling geometry, for example, an actuator tied to compressor pressure may control geometry, an engine management system may control geometry using a vacuum actuator, etc. Overall, a variable geometry assembly may allow for boost pressure regulation which may effectively optimize power output, fuel efficiency, emissions, response, wear, etc.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine or both), a wastegate, an exhaust gas recirculation valve, an electric motor, or one or more other components associated with an engine, a turbocharger (or turbochargers), etc.

Figure 2:
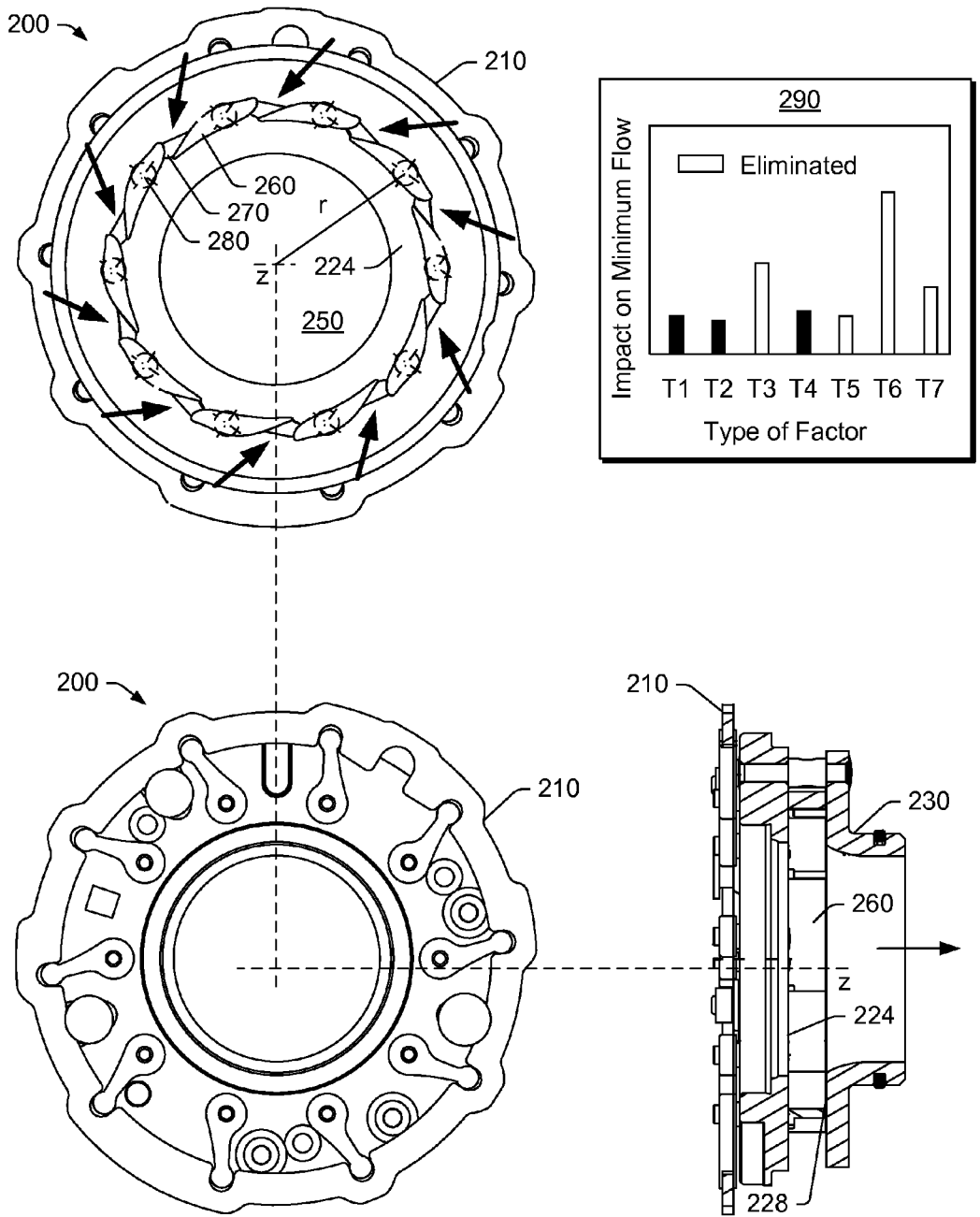
FIG. 2 is a series of views of an example of an assembly that includes vanes along with a plot of types of factors that can impact minimum flow of an assembly.

FIG. 2 shows various views of an assembly 200 and a plot 290 for types of factors that may impact minimum flow position of an assembly. As shown, the assembly 200 includes a base 210 with a lower plate 224 and an upper plate 228 where a series of vanes 260 are arranged at a radial distance, r, about a z-axis of a wheel space 250. In the example of FIG. 2, each vane includes an extension 270 to define a minimum flow spacing between adjacent vanes, for example, upon simultaneous rotation of each vane about its pivot axis defined by a post 280. While the example of FIG. 2 shows ten vanes arranged about the z-axis at successive 36 degree intervals, an assembly may include a different number of vanes arranged at different intervals.

In a bottom view of the assembly 200, various components of the base 210 are shown that provide for simultaneously pivoting the vanes about their respective pivot axes. In a cross-sectional side view of the assembly 200, the vanes 260 are shown as being disposed between the lower plate 224 and the upper plate 228. In general, clearance exists between the plates 224 and 228 to allow for pivoting of the vanes 260. During operation, most gas should be directed to the wheel space 250 through flow spaces between adjacent vanes 260 (e.g., vane throats), however, clearance between upper surfaces of the vanes 260 and the upper plate 228 may allow some gas to pass to the wheel space 250. Similarly, clearance between lower surfaces of the vanes 260 and the lower plate 224 may allow some gas to pass to the wheel space 250.

As described herein, a vane can include a thickness (width between lateral surfaces) that acts to reduce flow between the vane and a plate or plates. In particular, a vane can include an increased thickness at or near a trailing edge to reduce flow between the vane and a plate or plates, which, in turn, for a series of such vanes, acts to direct more flow through throats defined by adjacent vanes. Flow between a vane and a plate or plates may be referred to as leakage (e.g., mass leakage), which may impact vane loading (e.g., pressure on a vane). In general, vane loading depends on vane profile and decreases from trailing edge to leading edge (e.g., static pressure may differ by about 40% between trailing and leading edges).

As to the plot 290, it indicates various types of factors that can impact minimum flow spacing between adjacent vanes for a minimum flow position of an assembly (e.g., various types of wear, etc.). Some of these types of factors may optionally be eliminated, for example, through use of the vanes 260, as arranged in the assembly 200.

Figure 3:
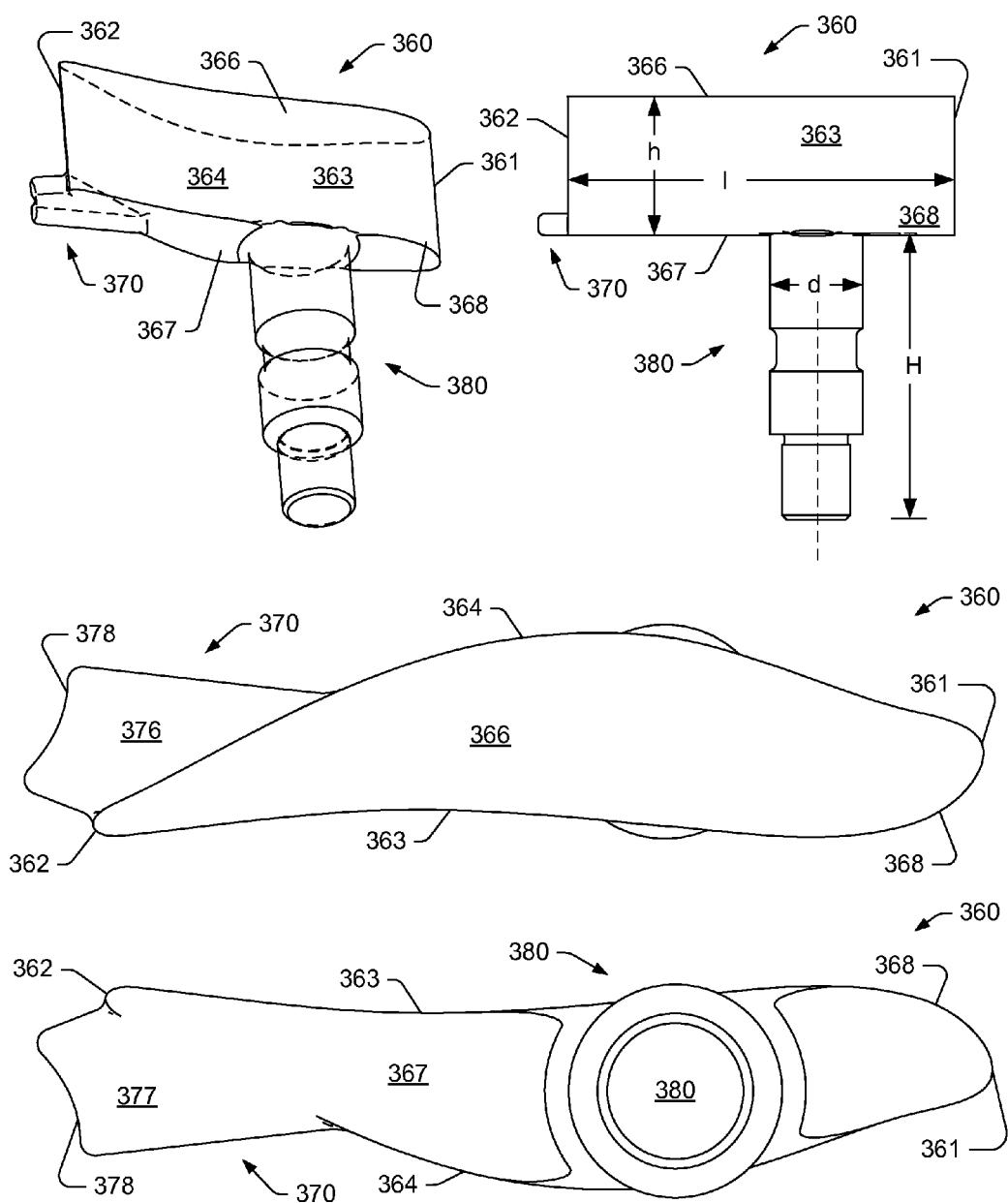
FIG. 3 is a series of views of an example of a vane that includes an extension to define, in part, a minimum flow distance.

FIG. 3 shows various views of an example of a vane 360, which may optionally be used for the assembly 200 of FIG. 2. As shown in FIG. 3, the vane 360 includes an extension 370 and a post 380 as well as a leading edge 361 and a trailing edge 362 with a pair of lateral surfaces 363 and 364 that extend therebetween. In the example of FIG. 3, the lateral surface 363 may be referred to as a suction surface, to be oriented toward a rotational axis of a wheel; whereas, the lateral surface 364 may be referred to as a pressure surface, to be oriented away from a rotational axis of a wheel. The vane 360 further includes an upper surface 366 and a lower surface 367, which may be planar surfaces.

In a side view or projection view, the vane 360 has a vane height, h, and a vane length, l, while the post 380 has a post height, H, and a post diameter d. The post 380 includes various features (e.g., surfaces, shoulders, etc.) to cooperate with a mechanism to pivot the vane about a pivot axis defined by the post 380 (see, e.g., the assembly 200 of FIG. 2).

As to the extension 370, an upper surface 376 and a lower surface 377 meet at a contact surface 378. In the example of FIG. 3, the vane 360 further includes a stop surface 368. For two of such vanes arranged about an axis and adjacent to each other, the contact surface 378 of one of the vanes forms a contact with a stop surface 368 of the other one of the vanes to thereby define a minimum flow spacing between the vanes. As described herein, the minimum flow spacing may be a throat width that is not affected by various types of factors associated with pivoting of such vanes about their respective pivot axes (e.g., a reproducible minimum flow spacing may be achieved).

In the example of FIG. 3, the extension 370 extends from the lateral pressure surface 364 of the vane 360 to its contact surface 378 while the stop surface 368 exists on the lateral suction surface 363 of the vane 360. As described herein, other configurations of contact and stop surfaces are possible (see, e.g., FIG. 6).

Figure 4:
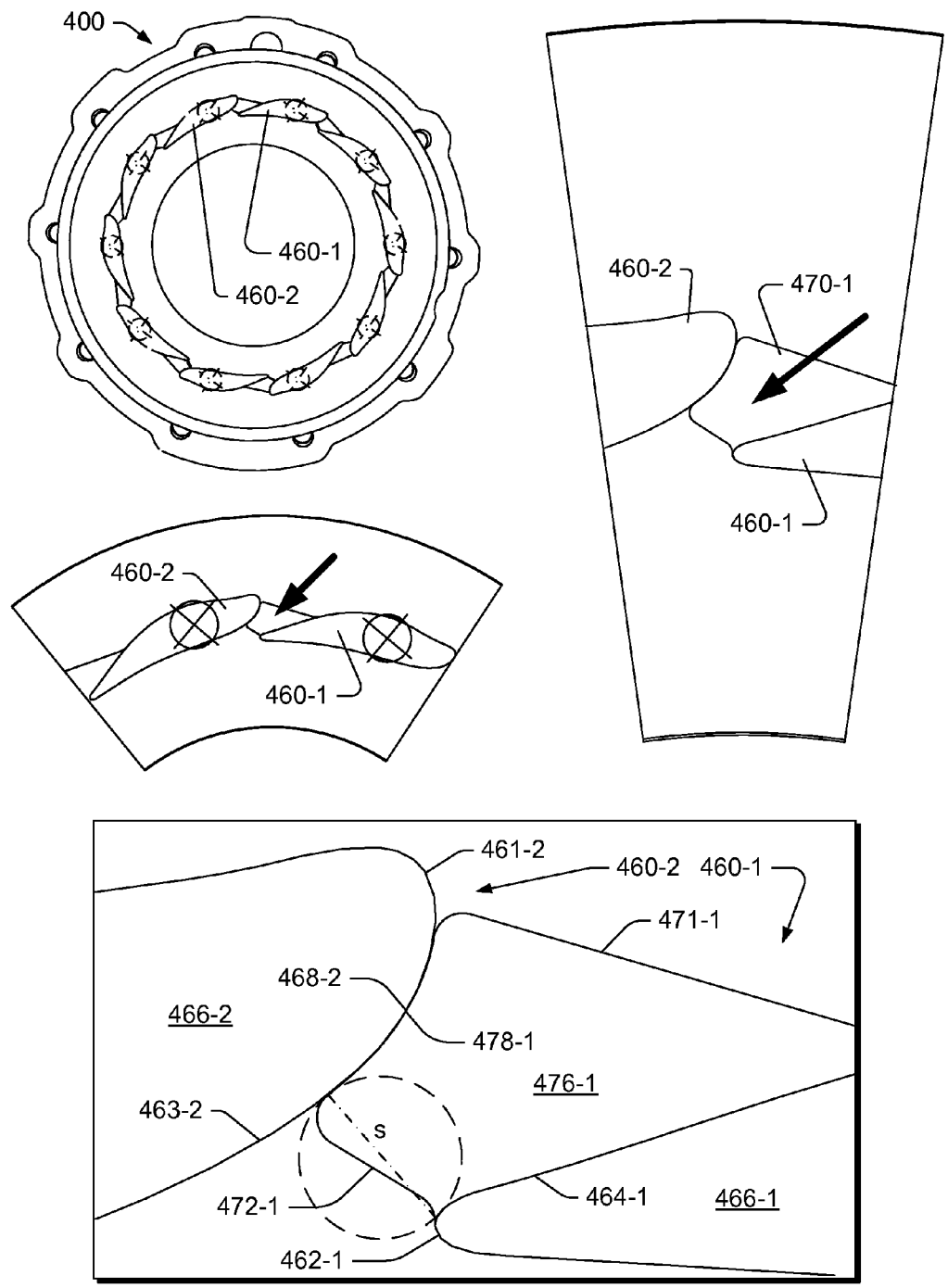
FIG. 4 is a series of side views of an assembly that includes vanes.

FIG. 4 shows various views of an example of an assembly 400 that includes a first vane 460-1 and a second vane 460-2. As illustrated in an enlarged view (lower view of FIG. 4), a contact is formed between the contact surface 478-1 of the first vane 460-1 and the stop surface 468-2 of the second vane 460-2. Once the contact is formed, a distance, s, exists between the lateral pressure surface 464-1 of the first vane 460-1 and the lateral suction surface 463-2 of the second vane 460-2. The distance, s, may be defined as a diameter of a circle having a circumference tangent to the lateral pressure surface 464-1 and tangent to the lateral suction surface 463-2.

In the example of FIG. 4, the contact surface 478-1 has a contour that matches a contour of the stop surface 468-2. As described herein, a stop surface may be a smooth portion of a lateral surface or may have a different shape, for example, to cooperate with a shape of a contact surface. As an example, consider an extension that includes a flat contact surface and a corresponding flat stop surface, which may be a flat surface machined into a lateral surface of a vane. As described herein, such surfaces may be shaped to contact over an area that acts to minimize stress (or force). Further, the shapes may act to ensure proper seating to stabilize contact such that vibrations, pressure fluctuations, etc., are unlikely to cause variations in minimum flow spacing between lateral surfaces that would alter a minimum flow condition (e.g., defined by total number of throats and optionally leakage).

As shown in the example of FIG. 4, the extension 470-1 includes a leading edge 471-1 and a trailing edge 472-1. One or both of these edges may have a profile beneficial to flow through a throat defined at least in part by the extension. For example, the leading edge 471-1 may be configured as a single edged knife blade where its flat side is to be positioned adjacent a flat plate (see, e.g., the plates 224 and 228 of FIG. 2) and its beveled side is to be positioned in, to define in part, a throat passage. The leading edge 471-1 may increase slightly in height as it approaches the contact surface 478-1, for example, to ensure proper seating and distribution of force. The trailing edge 472-1 may be shaped with a downward sloping bevel and may optionally have a greater height at the contact surface 478-1.

Figure 5:
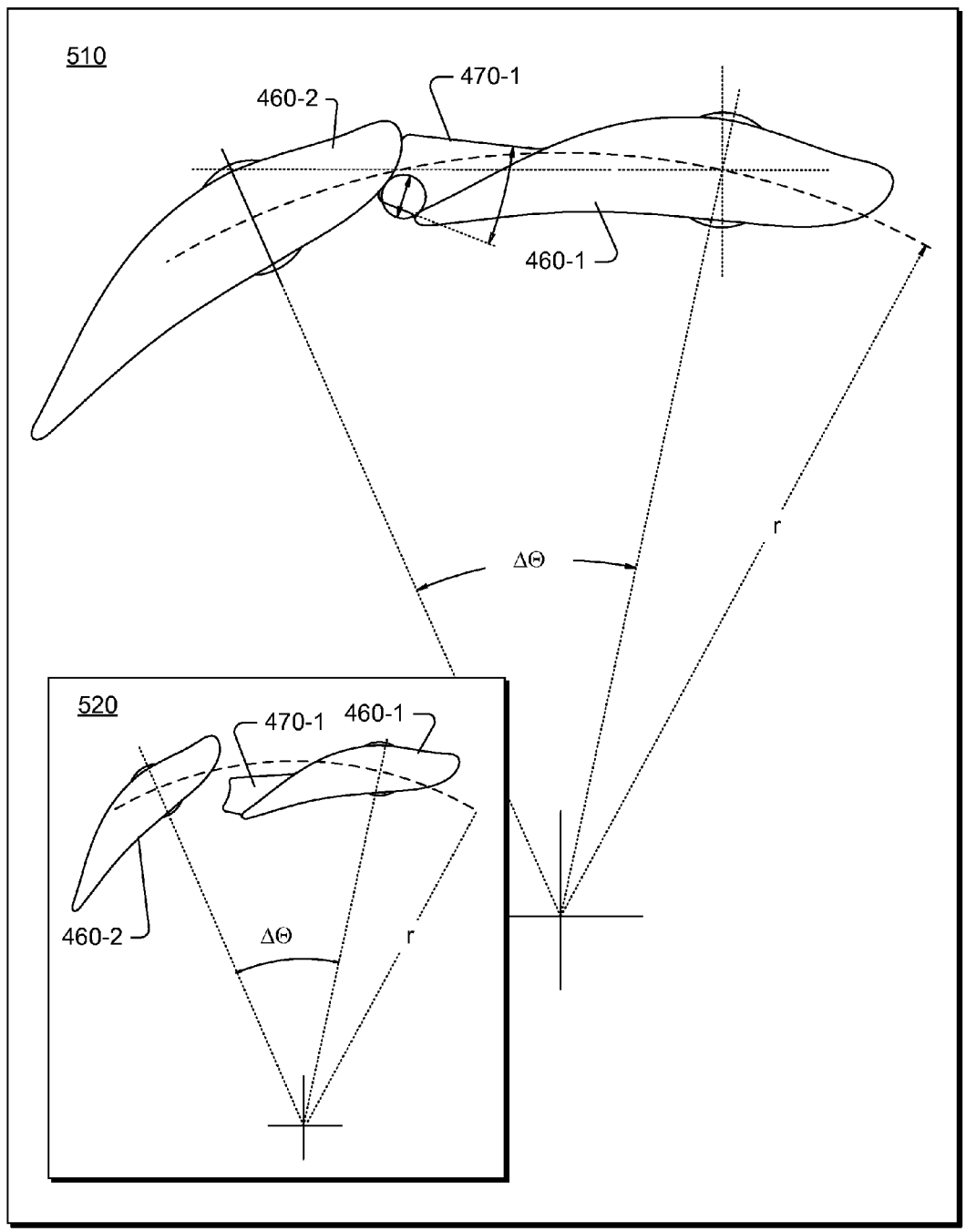
FIG. 5 is a series of views of two vanes of the assembly of FIG. 4.

FIG. 5 shows two top views of the vanes 460-1 and 460-2 of FIG. 4. In one view, for a contact state 510, a contact is formed between the extension 470-1 of the vane 460-1 and a surface of the vane 460-2. In another view, for an open state 520, the vanes 460-1 and 460-2 are shown as being pivoted about their respective pivot axes (e.g., about 10 degrees) such that a contact does not exist. As described herein, an extension may have a profile that does not substantially interfere with flow through a throat. For example, an extension may be relatively flat and positioned even with a lower or an upper surface of a vane. The maximum height of an extension may be on the order of 0.1 or less than height of a vane.

As described herein, for vane positions other than a minimum flow position (e.g., for open states), a controller may be able to adjust to accommodate any discrepancies introduced by an extension, extensions, stop surface, stop surfaces, etc. Again, the minimum flow position (e.g., closed state) may impact performance, emissions, etc. Thus, the benefits of providing features to enhance minimum flow position (e.g., closed state) consistency can outweigh disadvantages that may occur due to an extension altering flow for a position greater than the minimum flow position (e.g., open state).

Figure 6:
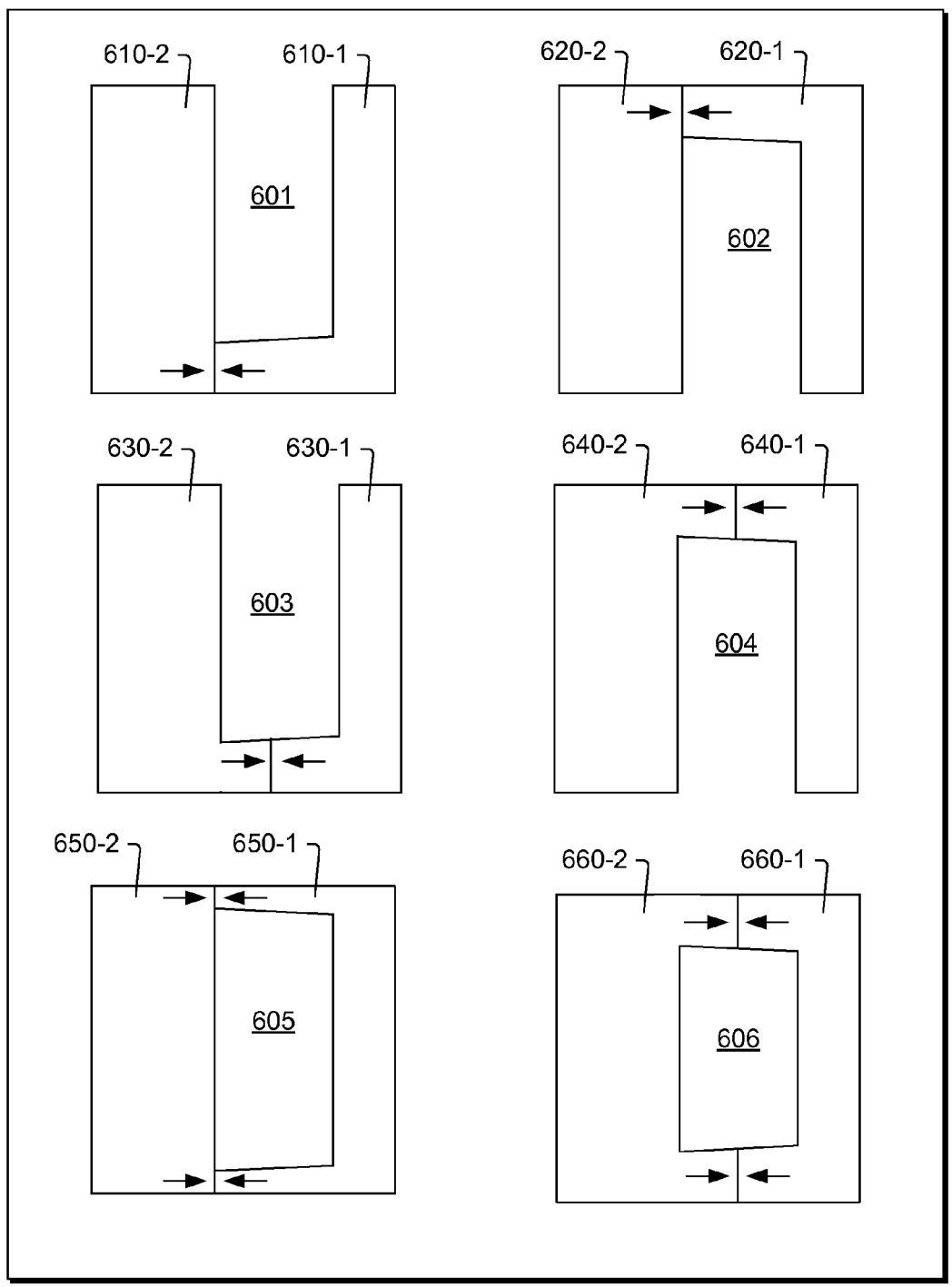
FIG. 6 is a series of views of examples of vanes.

FIG. 6 shows various approximate views of examples of two vanes that contact to define a minimum flow position. In an example 601, a vane 610-1 includes a lower extension that contacts a vane 610-2. In an example 602, a vane 620-1 includes an upper extension that contacts a vane 620-2. In an example 603, a vane 630-1 includes a lower extension that contacts a lower extension of a vane 630-2. In an example 604, a vane 640-1 includes an upper extension that contacts an upper extension of a vane 640-2. In an example 605, a vane 650-1 includes extensions that contact a vane 650-2. In an example 606, a vane 660-1 includes extensions that contact extensions of a vane 660-2. As indicated in the examples of FIG. 6, a throat is defined between adjacent vanes by at least one extension. While the throat in the example 606 is defined by four extensions, more than four extensions may act to define a throat.

Figure 7:
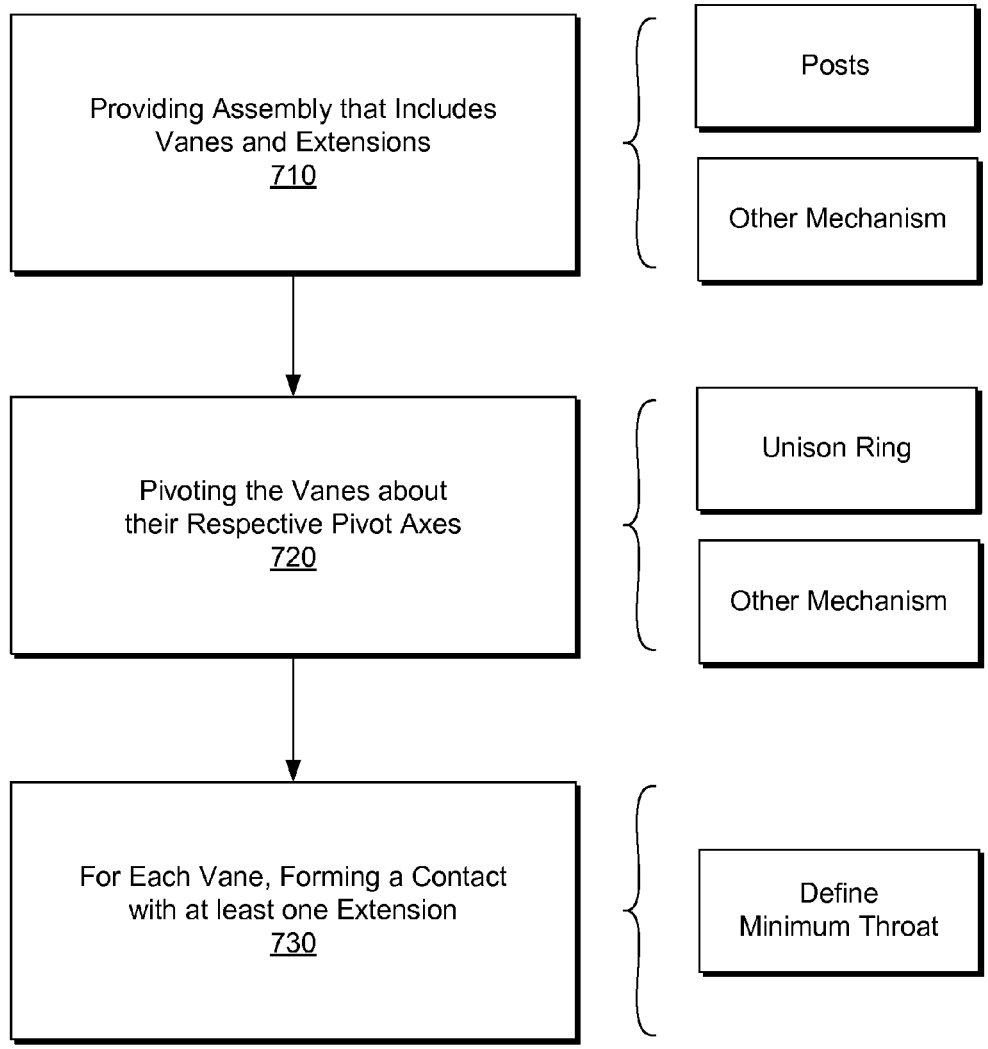
FIG. 7 is a block diagram of an example of a method.

FIG. 7 shows an example of a method 700. The method 700 includes a provision block 710 for providing an assembly that includes vanes and extensions, a pivot block 720 for pivoting the vanes about their respective pivot axes, and a formation block 730 for forming, for each vane, a contact with at least one extension.

Referring to FIG. 5, the forming of the method 700 may occur when moving from the open state 520 to the closed state 510. As shown, the vanes 460-1 and 460-2 remain positioned a radial distance from an axis while pivoting about their respective axes. As described herein, a mechanism may provide for sliding or other movement, optionally in conjunction with pivoting, to cause vanes to form a contact. Various vanes described herein may optionally be used in conjunction with such mechanisms to help ensure a minimum flow position for the vanes.

As described herein, a method can include providing a variable geometry assembly that includes vanes where each vane includes a pivot axis and an extension; pivoting the vane about their respective pivot axes; and forming contacts between the vanes via the extensions of the vanes to define a minimum flow position for the assembly. In such a method, the forming may form contacts by contacting each extension with a stop surface of an adjacent vane.

As described herein, a turbocharger can include a housing with a compressor end and a turbine end and a variable geometry turbine assembly at the turbine end of the housing that includes vanes where vane-to-vane contact defines a minimum flow position for flow of exhaust from a volute to a turbine wheel space. In such an assembly, each of the vanes can include an extension that defines, at least in part, a minimum flow distance between adjacent vanes. In such an assembly, adjacent vanes can define throats for flow of exhaust from the volute to the turbine wheel space.

As described herein, a method can include operating a turbocharger according to instructions where such instructions may optionally be in the form of one or more computer-readable storage media. For example, where a controller (e.g., ECU or other) includes memory that stores instructions, such instructions may be loaded into the memory to control operation of a variable geometry mechanism for a turbine, a compressor, a turbine and a compressor, etc.

As described herein, various acts may be performed by a controller (see, e.g., the controller 190 of FIG. 1), which may be a programmable controller configured to operate according to instructions. As described herein, one or more computer-readable media may include processor-executable instructions to instruct a computer (e.g., controller or other computing device) to perform one or more acts described herein. A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit. Such a controller may optionally be programmed to control one or more variable geometry mechanisms, exhaust gas recirculation, etc. Such a controller may optionally be programmed to perform one or more actions described with respect to example methods described herein or other methods.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. An assembly comprising:
   vanes; and
   a base configured to seat the vanes at a radial distance about an axis, wherein each vane comprises
      a leading edge and a trailing edge;
      a pair of lateral surfaces that meet at the leading edge and at the trailing edge;
      an extension that extends from one of the lateral surfaces and that comprises a contact surface; and
      a stop surface to form a contact with a contact surface of another vane to define a minimum open flow distance between the vane and the other vane.

2. The assembly of claim 1 wherein the extension extends from a lateral surface that comprises a pressure surface of the vane.

3. The assembly of claim 1 wherein the stop surface comprises a portion of a lateral surface that comprises a suction surface of the vane.

4. The assembly of claim 1 wherein the extension extends from a lateral surface that comprises a pressure surface of the vane and wherein the stop surface comprises a portion of a lateral surface that comprises a suction surface of the vane.

5. The assembly of claim 1 wherein the extension extends from a lateral surface that comprises a suction surface of the vane.

6. The assembly of claim 1 wherein the stop surface comprises a portion of a lateral surface that comprises a pressure surface of the vane.

7. The assembly of claim 1 wherein the extension extends from a lateral surface that comprises a suction surface of the vane and wherein the stop surface comprises a portion of a lateral surface that comprises a pressure surface of the vane.

8. The assembly of claim 1 comprising another extension that extends from one of the lateral surfaces.

9. The assembly of claim 8 wherein the other extension comprises the stop surface.

10. The assembly of claim 8 wherein the other extension comprises another contact surface.

11. The assembly of claim 1 wherein each vane comprises a post that defines a pivot axis.

12. The assembly of claim 1 wherein the extension comprises a leading edge and a trailing edge.

13. The assembly of claim 12 wherein at least one of the edges of the extension comprises a beveled edge.

14. The assembly of claim 1 wherein the base comprises a variable geometry turbine base.

15. The assembly of claim 1 wherein the base comprises a variable geometry compressor base.

16. A turbocharger comprising:
   a housing that comprises a compressor end and a turbine end; and
   a variable geometry turbine assembly at the turbine end of the housing that comprises vanes wherein vane-to-vane contact defines a minimum open flow position for flow of exhaust from a volute to a turbine wheel space wherein each of the vanes comprises
      a leading edge and a trailing edge,
      a pair of lateral surfaces that meet at the leading edge and at the trailing edge
      an extension that defines, at least in part, a minimum open flow distance between adjacent vanes and
      a stop surface to form a contact with a contact surface of another vane to define a minimum open flow distance between the vane and the other vane.

17. A method comprising:
   providing a variable geometry assembly that comprises vanes wherein each vane comprises
      a pivot axis,
      a leading edge and a trailing edge,
      a pair of lateral surfaces that meet at the leading edge and at the trailing edge,
      an extension that extends from one of the lateral surfaces and that comprises a contact surface, and
      a stop surface to form a contact with a contact surface of another vane to define a minimum open flow distance between the vane and the other vane;
   pivoting the vanes about their respective pivot axes; and
   forming contacts between the vanes via the extensions of the vanes to define a minimum open flow position for the assembly.

* * * * *